United States Patent [19]

Penrod

[11] 4,152,634

[45] May 1, 1979

[54] POWER CONTACTOR AND CONTROL CIRCUIT

[75] Inventor: John K. Penrod, Bellbrook, Ohio

[73] Assignee: Power Management Corporation, Centerville, Ohio

[21] Appl. No.: 833,234

[22] Filed: Sep. 14, 1977

Related U.S. Application Data

[63] Continuation-in-part of Ser. No. 753,516, Dec. 22, 1976, abandoned.

[51] Int. Cl.² ............................................. H02P 1/40
[52] U.S. Cl. .................................. 318/739; 318/289; 361/3; 361/13
[58] Field of Search ................. 361/3, 13; 318/207 R, 318/207 D, 207 J, 284, 285, 289, 739

[56] References Cited

U.S. PATENT DOCUMENTS

| | | | |
|---|---|---|---|
| 2,397,907 | 4/1946 | Akin | 361/3 |
| 2,970,251 | 1/1961 | Wickerham | 318/207 R |
| 3,181,047 | 4/1965 | Simon | 318/207 R X |
| 3,214,664 | 10/1965 | Ishikawa | 318/207 R |
| 3,558,910 | 1/1971 | Dale | 361/13 X |

*Primary Examiner*—Gene Z. Rubinson

*Attorney, Agent, or Firm*—Biebel, French & Nauman

[57] ABSTRACT

The power contactor for controlling the application of power to and the character of the current to a load includes a power relay having contacts connected between a source of power and the load, such as a motor or heater, with each of the contacts being provided with arc suppression means. A steering relay is provided to control the direction of current to a motor and thus its direction of rotation or the voltage applied to a heater. A control circuit insures that the steering relay contacts remain either open or closed while power is being applied to the load. The steering relay is provided with bracer bars to prevent short circuiting between relay contacts should any welding occur therebetween. The arc suppression means for each of the power relay contacts includes a solid state device, such as a triac, in parallel therewith, and auxiliary contacts for controlling the gating current to the triac. The auxiliary contacts close prior to either the opening or closing of the power relay contacts and open just after either the opening and closing of the power relay contacts, and therefore no gating current is applied to the triac while the power relay contacts are closed.

12 Claims, 6 Drawing Figures

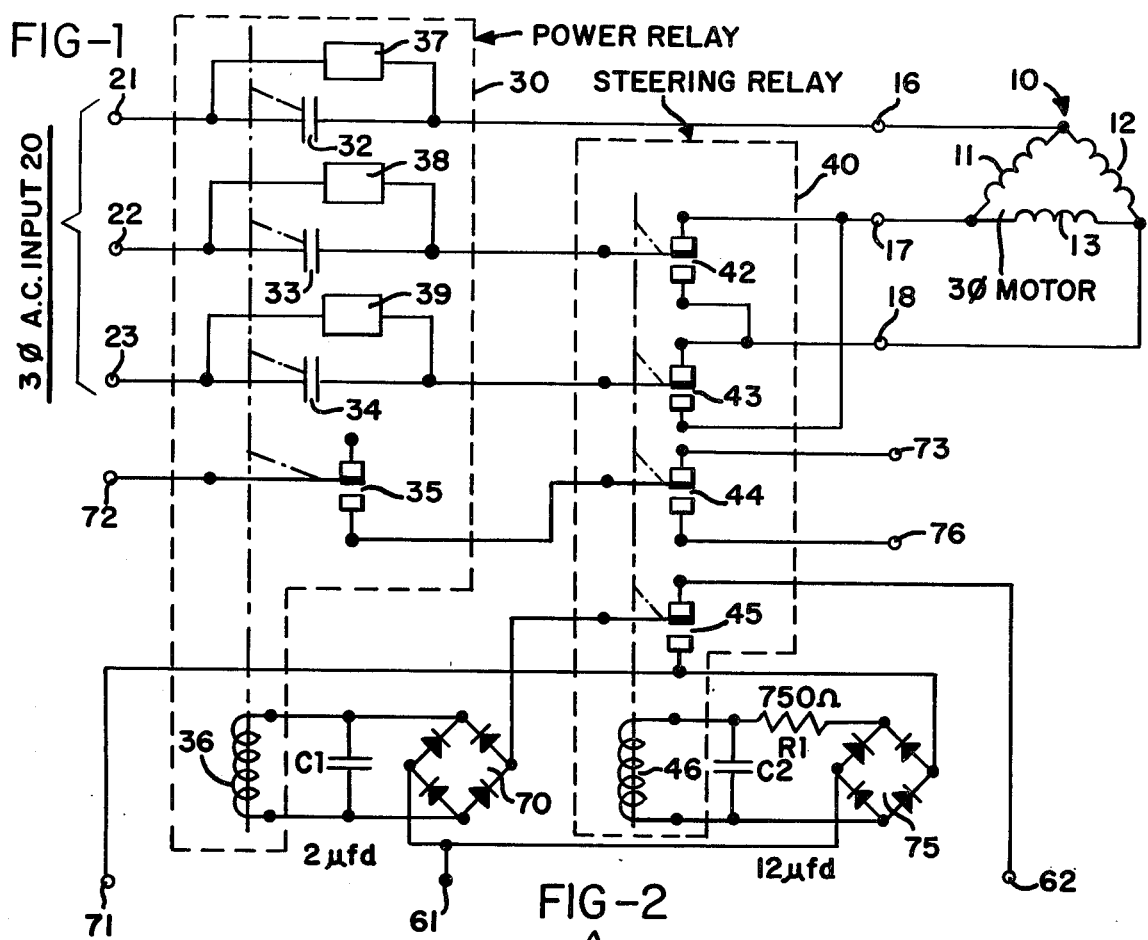
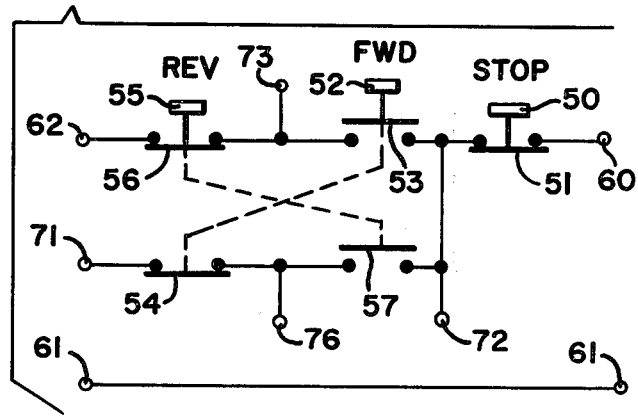
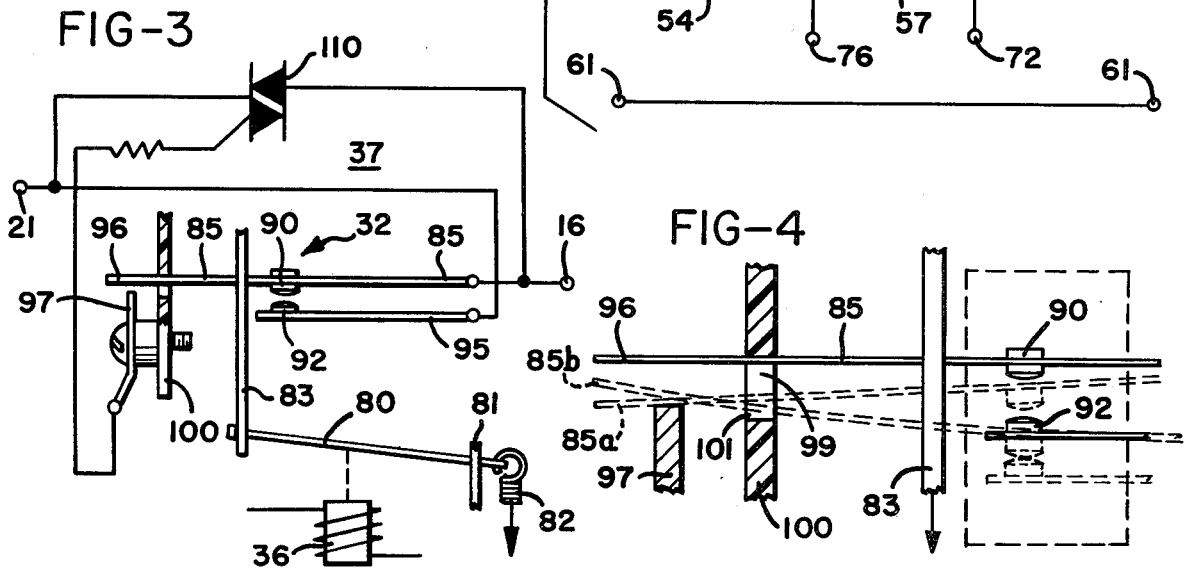

POWER CONTACTOR AND CONTROL CIRCUIT

RELATED APPLICATION

This application is a continuation-in-part of application Ser. No. 753,516, filed Dec. 22, 1976 now abandoned.

BACKGROUND OF THE INVENTION

This invention relates to a power contactor controlling the application of power to a load, such as an electric motor or heater.

Prior art motor control contactors frequently include two sets of power contactors, one set for each direction of rotation of the motor. Since arcing may occur across each contactor, means are normally provided to protect the contacts. For example, a contactor for use with a three phase motor will have three power contacts which close to rotate the motor in a forward direction, and three additional contacts which close to rotate the motor in the opposite direction, thus requiring a total of six arc suppression means to protect properly the contacts.

SUMMARY OF THE INVENTION

This invention relates to a power contactor for controlling the current to and character of an electric current to a load, and particularly to a contactor device which is inexpensive and which requires a minimum of arc suppression circuitry.

A single power relay is employed to control the application and removal of power to a load such as an electric motor or heater, and a steering relay is used to control the character of the current to the load, such as the direction of current to the motor or the voltage to the heater. Control circuit means are provided to insure that the contacts of the steering relay not open or close during the time that current is applied to the load, and therefore arc suppression means across the steering relay contacts are unnecessary. Accordingly, arc suppression means are provided only for the power relay contactors, thus reducing the entire cost of the control unit.

In a preferred embodiment of the invention, power is applied to a load through normally closed contacts of the steering relay, and the power relay is energized directly. When it is desired to change the character of the current, i.e., to reverse the direction of rotation of the motor, or increase the temperature of the heater, the power relay is energized through a set of normally open contacts of the steering relay, thus insuring that the steering relay has been energized and those contacts connected to the load have closed prior to the closure of the contacts of the power relay. The steering relay circuitry is provided with time delay means which, upon deenergization of the load, cause the steering relay to remain energized long enough for the contacts of the power relay to open. Therefore, the contacts of the steering relay are always in their desired position during application and removal of power to the load, and therefore arc suppression means are necessary only across the contacts of the power relay.

The arc suppression means used in the preferred embodiment of the invention is similar to that shown in U.S. Pat. No. 3,982,137 wherein an auxiliary contact associated with each of the contactors of the power relay is used to control gating current to a solid state device connected in parallel with the main contactors. The auxiliary contacts are designed to close just prior to either the closing or opening of the main contacts and will open just after either the closing or opening of the main contacts to provide gating current to the solid state device thereby to reduce the potential across the main contact to prevent arcing during opening or closing thereof and to remove the gating current when the contacts are closed to protect the solid state device and prevent it from carrying current continuously should the main contacts fail to close or close with an appreciable resistance therebetween.

It is therefore an object of this invention to provide an improved and inexpensive control circuit of the type described for controlling the application of electrical current to a load using a minimum number of arc suppression means, and in particular a power application control circuit for an electric load including a power relay including main contacts connected between a source of electrical current and a load, and auxiliary contacts which close momentarily prior to and open shortly after the opening and closing of said main contacts, and solid state arc suppression circuit means responsive to the operation of said auxiliary contacts and connected in parallel with said main contacts for providing a low impedance current path around said main contacts to suppress arcing, a steering relay including contacts connected between the source of electrical current and the load for controlling the character of the current to the load whereby the current will have a first characteristic when the steering relay is deenergized and a second characteristic when the steering relay is energized, and control circuit means connected to said power relay and said steering relay for controlling the operation thereof, said control circuit means including a circuit interconnection through said steering relay whereby said steering relay can be neither energized nor deenergized while current flows through the contacts of said power relay.

These and other objects and advantages of the invention will be apparent from the following description, the accompanying drawings and the appended claims.

BRIEF DESCRIPTION OF THE DRAWINGS

FIG. 1 is an electrical schematic of a motor direction control circuit;

FIG. 2 is a schematic of a switching circuit used to control the direction of rotation of the motor;

FIG. 3 is a schematic representation of one of the power relay contactors and associated arc suppression circuit means;

FIG. 4 illustrates the operation of the auxiliary contact associated with each of the power relay contactors;

BRIEF DESCRIPTION OF THE PREFERRED EMBODIMENT

Figure 5:
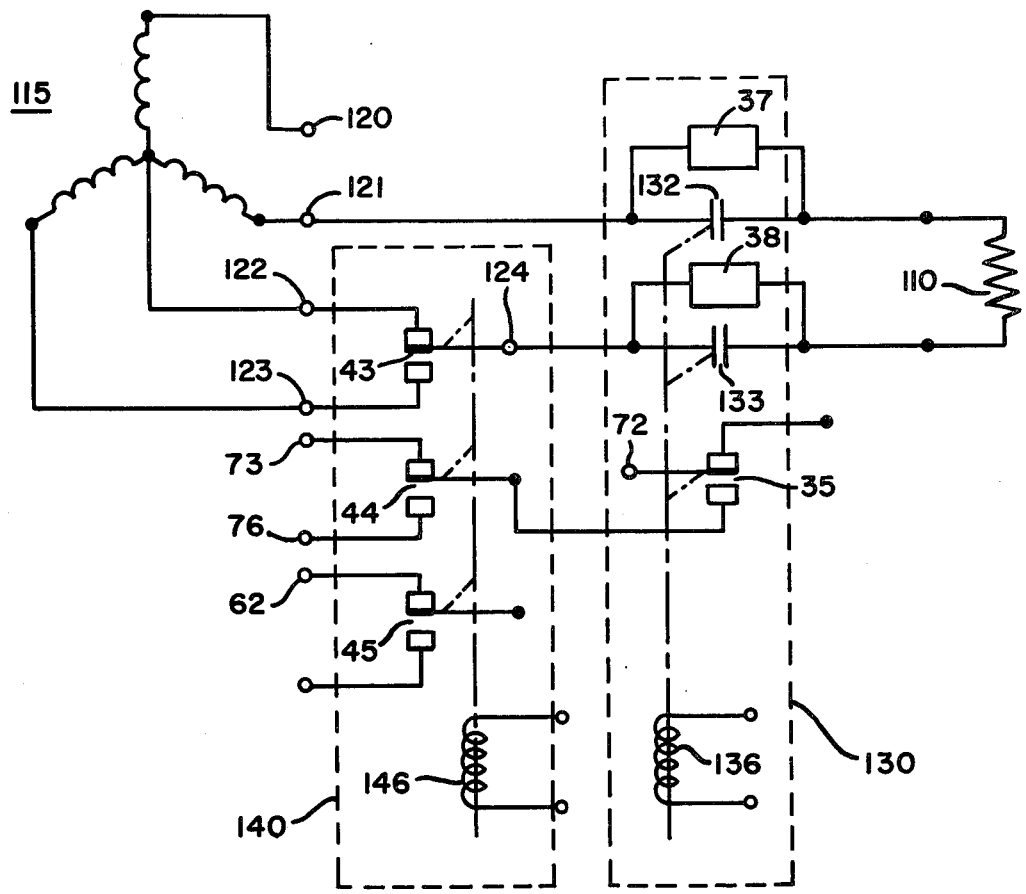
FIG. 5 is a partial electrical schematic of a heater control circuit.

Referring now to FIG. 1 which shows one embodiment of the invention, a three phase motor 10 is shown having three windings 11, 12 and 13 connected to terminals 16, 17 and 18 which are in turn connected to a source of alternating current 20 through input terminal connections 21, 22 and 23.

Current to the motor 10 is controlled by means of power relay 30 which includes a plurality of normally-open contactors 32, 33 and 34, single-pole, double-throw contactor 35, and coil 36. The contactors 32-34 are preferably provided with arc suppression means 37-39, respectively, the details of which will be discussed later.

The direction of rotation of the motor 10 is controlled by a steering relay 40. This relay includes four double-throw contactors 42-45 and a coil 46. When in the unenergized condition, terminals 22 and 23 are connected through the normally-closed elements of contactors 42 and 43 to terminals 17 and 18, respectively, thus causing the motor 10 to rotate in the forward direction; and when the relay 40 is energized, the connection between terminals 22 and 23 and terminals 17 and 18 is reversed causing the motor to rotate in the reverse direction.

The circuit shown in FIG. 1 is so designed that the application and removal of current to the motor 10 always occurs through the contacts of the power relay 30; the position of the contacts of the steering relay are not changed when current is applied to the motor.

Control circuit means are provided for controlling the power relay and steering relay to control the direction of rotation of the motor and to prevent the steering relay contacts from being switched from one position to another while current is applied to the motor.

The control circuit means includes the switching arrangement shown in FIG. 2 which preferably comprises a stop button 50, including normally closed contacts 51; a forward (FWD) button 52, including normally open contacts 53 and normally closed contacts 54; and a reverse (REV) button 55 including normally closed contacts 56 and normally open contacts 57. Alternating current is applied to input terminals 60 and 61, and when it is desired to rotate the motor 10 in the forward direction, push button 52 is depressed and output terminal 62 will be electrically connected to terminal 60 through normally closed contacts 51 and 56 and the now closed contacts 53 of the forward button 52.

Referring to FIG. 1, terminal 62 is connected through the normally closed contacts 45 of relay 40 and to one side of a bridge rectifier 70. The other side of the bridge receifier is connected to the common connector 61. Capacitor C1 functions as a ripple filter to prevent relay chatter. Accordingly, when the FWD button is pressed, current is applied to the relay solenoid 36 to energize that relay and to provide electrical connections between terminals 21-23 and the windings of the motor 10.

A holding circuit is provided through the normally open contacts 35 of relay 30, one contact of which is connected to terminal 72, the other contact being connected to the normally closed contacts 44 of relay 40 and thus to terminal 73, thereby providing a parallel path of current around contacts 53 (FIG. 2). Accordingly, once the FWD button is pressed, relay 30 will remain energized until either the stop button 50 or the reverse button 55 is activated. Depressing stop button 50 will remove holding current from the relay 30, it will deenergize, and contactors 32-35 will open.

When it is desired to rotate the motor in the reverse direction, the reverse button 55 is depressed. This opens contacts 56, thus removing power to the coil 36 deenergizing relay 30 (assuming it was energized); and simultaneously, contact 57 is closed thereby connecting terminal 60 to terminal 71 through contacts 54 of button switch 52.

Terminal 71 is connected to one side of bridge rectifier 75, the other side of which is connected to the common terminal 61. The output of rectifier 75 is applied to the coil 46 of relay 40, causing it to energize after a time delay determined by the values of capacitor C2 and resistor R1, therefore reversing the connection between terminals 22-23 and terminals 17-18. This time delay is sufficient to allow relay 30 to deenergize and the arc suppression circuits to be disabled before the relay 40 is energized, thus protecting the contacts 42-44 of the steering relay 40. When relay 40 is energized, current is applied to the bridge rectifier 70 through the normally-open contacts 45, thus energizing relay 30 and applying power to the motor 10.

Holding current for the relay 40 is obtained from terminal 72 through contacts 35 of relay 30 and the normally-open contacts 44 of relay 40 to terminal 76, thus providing a parallel path for contacts 57.

When the stop button 50 is depressed, power to both relay coils will be removed, and relay 36 will be deenergized, opening its contactors 32-35. Relay 40, however, will remain energized for a short period of time due to the action of capacitor C12 which therefore acts as a time delay means insuring that the contactors of relay 40 open after the contactors of relay 30. Thus, any arcing which might occur due to the opening of the circuit to the motor will be handled by the contactors 32-34 of the power relay rather than the contactors in the steering relay 40, and it is for this reason that the contactors of the power relay are preferably provided with arc suppression means 36-38.

Accordingly, when the motor 10 is to be rotated in the reverse direction, relay 40 will be energized first, and all of its contacts will close prior to the energization of relay 30.

FIG. 3 is a schematic representation illustrating one of the contactors 32 of relay 30 and its associated arc suppression circuit 37. Contactor 32 is represented by way of example, although it is to be understood that the relay 30 will include three similar contactors in stacked relationship, each with its own arc suppression circuit means.

The solenoid 36 of the relay 30 is magnetically coupled to an armature 80 and will pull the armature downwardly when the relay is energized. The armature rotates about a pivot 81 and is urged away from the solenoid by a spring 82. An insulated linkage member 83 is pivotally attached to the end of upper contact bar 85. The member 83 also extends upwardly and engages similar bars for the other contactors of the relay.

The contactor 32 includes a first main contact element 90, carried by the contact bar 85, and a second main contact element 92, positioned directly opposite therefrom and carried by a contact bar 95. Both contact bars 85 and 95 are of sufficient cross sectional area to carry the motor current on a continuous basis, yet are flexible enough to bend during operation of the relay.

As shown in FIG. 4, the contact bar 85 extends through and is attached to the linkage 83, and the end of the bar 85 forms an auxiliary contact 96 which is spaced from a fixed contact 97. The contact bar 85 also passes through an opening 99 in a fixed insulated support member 100. The member 100 also extends upwardly and functions in a similar manner with respect to the other contactors of the relay.

The bottom portion 101 of the opening 99 is so positioned with respect to the contact bar 85 that it engages the bar as the solenoid 36 pulls the armature, and thus the member 83, downwardly when the relay is energized. As a result, contacts 96 and 97 close momentarily prior to the closure of the contacts 90 and 92, as shown by the dashed line 85a; thereafter contacts 90 and 92 engage to complete the main circuit; and finally, contacts 96 and 97 open, as shown by the dashed lines 85b. Similarly, when the relay deenergized, contacts 96 and 97 will engage as the armature 80 begins to move upwardly; contacts 90 and 92 will then open; and thereafter contacts 96 and 97 will open.

Referring again to FIG. 3, triac 110 has its main terminals connected in parallel with the contactor 32, and its gate electrode is connected to the contact 97. Thus, during relay energization, gating current will be applied to the triac 110 momentarily prior to and during the closure of the main contact elements 90 and 92 of the contactor 32, and thereafter, gating current will be removed, allowing full current to pass through the main contacts and to cause any fretting action which may be necessary at the surface of the main contacts so they may thereafter carry the full load. By removing gating current after the main contacts have closed, the triac will cease conduting at the first zero crossing of the current therethrough, and should the main contacts have developed a high resistance, the triac will not be forced to carry current for any appreciable period of time.

Upon relay deenergization, gating current to the triac will be provided through contacts 96 and 97 as the relay armature 80 begins to move upwardly, contacts 90 and 92 will then open with the triac in full operation; and after the contacts have fully opened, the contacts 96 and 97 will then open and remove gating current from the triac.

It will be appreciated by those skilled in the art that other arc suppressing means could be used in connection with the contactors 32 through 34 of the relay 30, or that these contactors could be so constructed as to handle any arcing which occurs when switching current to the motor 10. The steering relay 40, on the other hand, can be of simpler and less expensive construction, and therefore the overall cost of a contactor built in accordance with this invention can be lower, and the performance greater than in prior art devices. Also, the contactor described above is smaller than prior art devices. For example, a NEMA, size 2 rated contactor of this design occupies approximately 35 square inches less panel area than a similarly rated contactor constructed according to prior art standards.

FIG. 5 illustrates another embodiment of the invention wherein a load, in this example an electric heater, 110 is connected to a source of electrical current 115 by means of contacts 132 and 133 of power relay 130. The contacts 132 and 133 are provided with arc suppression means 37 and 38, respectively, which operate in the manner previously described. The source of current 115 is shown as a wye connected transformer secondary having output terminals 120-123 with output terminal 122 being a common terminal. For example, the voltage between terminals 122 and any of the terminals 120, 121 and 123 might be approximately 277 volts while the voltage between terminals minals 120-121, 121-123 and 123-120 might be approximately 480 volts although it is to be understood that other voltage levels can be employed.

The steering relay 140 controls the character of the current applied to the load 110. In the deenergized condition of the relay 140, a voltage having a first characteristic, namely 277 volts, is connected from terminal 122 through the normally-closed contacts 143 to the load, and when relay 140 is energized, a voltage of a second characteristic, namely 480 volts, is applied through the normally-open contacts. Therefore the magnitude of the current flowing through the heater 110 depends on the steering relay.

Steering relay 140 also includes auxiliary contacts 44 and 45 and power relay 130 includes auxiliary contacts 35 which function in the same manner as the auxiliary contacts of the same number shown and described in connection with FIG. 1.

In operation, relay 140 is controlled in the same manner as relay 40 of FIG. 1, that is, the relay will neither be energized or deenergized while current is flowing to the load. The circuitry shown in FIG. 1 may be used to insure that the contacts of the relay 130, which include the arc suppression means 37 and 38, carry the burden of controlling the current flow to the load, and that the contacts of relay 140 never open or close while current is flowing therethrough.

Figure 6:
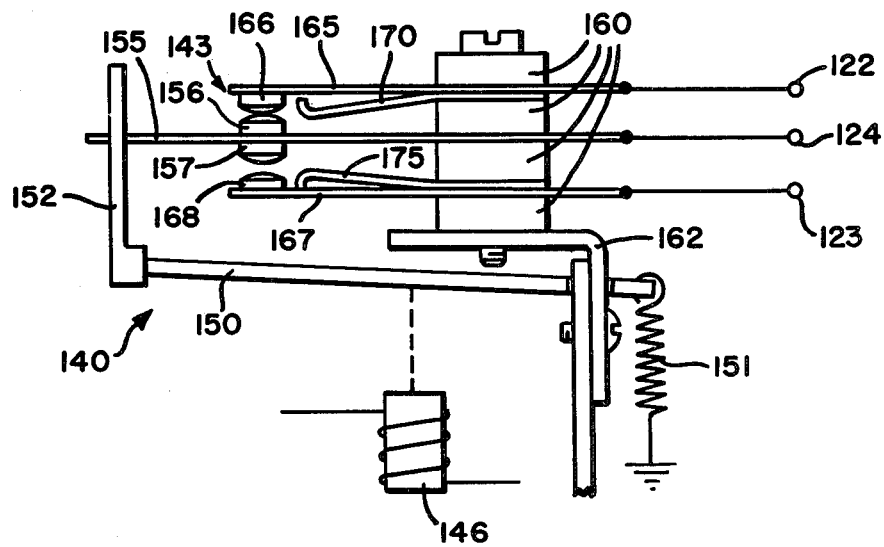
FIG. 6 is a detail of the steering relay showing the short circuit preventing bracer bar.

FIG. 6 is an enlarged view of the steering relay 140 showing the details of its construction. The relay includes a solenoid 146 which is magnetically coupled to an armature 150 to pull the armature downwardly when the relay is energized. The armature is biased away from the solenoid by means of a spring 151. An insulated linkage 152 connects the armature to the outward end of a movable contact bar 155 which is provided with an upper contact member 156 and a lower contact member 157. The contact bar 155 is flexible and is supported at its other end between insulated spacer blocks 160 which are supported on bracket 162.

The relay also includes an upper flexible contact bar 165 which includes a contact member 166 which, in the normally closed position (as shown) makes contact with the contact member 156 to provide a path of current between terminals 122 and 124. The relay also includes a lower flexible contact bar 167 which has provided at its end a contact member 168 which, when the relay is energized, is engaged by the contact 157 to provide a current path between terminals 123 and 124. Both of the contact bars 165 and 167 are supported within the insulated spacer members 160, as shown.

The contacts 156 and 166 or 157 and 158 may become welded together sufficiently that they do not separate after the relay has been either energized or deenergized. Should this occur, and the center contact bar move sufficiently to permit contact with the other contact, then a short circuit would exist between terminals 122 and 123. Referring briefly to FIG. 5, it will be noted that these terminals are connected across one winding of the current source 115 and therefore this situation could cause considerable damage both to the steering relay and to the current source.

Accordingly, this invention includes a bracer bar 170 which is formed from a heavy steel, relatively inflexible member which extends outwardly from between the insulated spacers 160 then downwardly with the end being bent upwardly and positioned near the contact 166. In the deenergized condition of the relay, contact member 156 engages contact 166 and causes the contact bar 165 to be flexed upwardly slightly, and the end of the bracer bar 170 therefore is spaced from the lower surface of the contact bar 165. However, when the relay is energized, the contact bar 155 will move downwardly, but contact bar 165 will be prevented from moving downwardly by the end of the bracer bar 170.

Similarly, a lower bracer bar 175 is associated with the lower contact bar 167, and its end is positioned adjacent the contact member 168. When the relay is energized, the contact 157 engages contact member 168 and causes the flexible contact bar 167 to move downwardly and slightly away from the end of the bracer bar 175. When the relay is deenergized, however, the bracer bar 175 prevents contact 168 from moving upwardly and should the weld between the contact be strong enough, it will also prevent the contact bar 155 from moving up sufficiently to create a current path between contact members 156 and 166.

A similar arrangement could be used with contacts 42 and 43 with the steering relay 40 shown in FIG. 1 to prevent inadvertent short circuiting from occurring between terminals 22 and 23.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a power application control circuitry for an electric load including
    a power relay including main contacts connected between a source of electrical current and a load, and auxiliary contacts which close momentarily prior to and open shortly after the opening and closing of said main contacts, and
    solid state arc suppression circuit means responsive to the operation of said auxiliary contacts and connected in parallel with said main contacts for providing a low impedance current path around said main contacts to suppress arcing,
    the improvement comprising
    a steering relay including contacts connected between the source of electrical current and the load for controlling the character of the current to the load whereby the current will have a first characteristic when the steering relay is deenergized and a second characteristic when the steering relay is energized, and
    control circuit means connected to said power relay and said steering relay for controlling the operation thereof, said control circuit means including a circuit interconnection through said steering relay whereby said steering relay can be neither energized nor deenergized while current flows through the contacts of said power relay.

2. The power application control circuitry of claim 1 wherein said load is an electric motor and wherein said steering relay controls the direction of current flow through said motor such that when said steering relay is deenergized the motor will rotate in one direction and when said steering relay is energized, the motor will rotate in the reverse direction.

3. The power application control circuitry of claim 1 wherein said load is an electric heater and wherein said steering relay controls the voltage applied to said heater whereby when said steering relay is energized the voltage to said heater is a first magnitude, and when said steering relay is energized, the voltage applied to said heater is a second magnitude.

4. Power application control circuitry for an electric load comprising
    power relay means including contacts connected between a source of electrical current and the load for controlling the application of power to said load,
    steering relay means including contacts connected between the source of power and the input terminals of the load for controlling the character of the current flow through said load for causing the current to said load to have a first characteristic when said steering relay means is deenergized and to have a second characteristic when said steering relay means is energized,
    control circuit means connected to said power relay means and said steering relay means for controlling the operation thereof, said control circuit means including a circuit interconnection through said steering relay means whereby when current of the second characteristic is desired, the contacts of said power relay means close only after said steering relay is energized, said control circuit means further including time delay means for delaying the deenergization of said steering relay means until after the contacts of said power relay have opened and current to the load is completely removed.

5. The circuit of claim 4 further including arc suppression means associated with each of said contactors of said power relay means.

6. The circuit of claim 4 further including time delay means associated with said steering relay means for delaying deenergization thereof for a time period longer than the time required for the power relay means to deenergize.

7. The circuitry of claim 4 including arc suppression means associated with the contacts of said power relay means comprising
    semiconductor means having power conducting terminals connected across said contacts and a gate electrode terminal,
    switching means for applying gate control current to said gate electrode,
    means for actuating said switching means for causing gate control current to be applied to said gate electrode just prior to either the opening or closing of said contactor and for thereafter removing said gate control current whereby the potential across said contactor is momentarily reduced to prevent arcing during opening and closing thereof and whereby said gate control current is not maintained when said contactor is closed thereby protecting said semiconductor means against overload in the event said contactor should develop an appreciable contact resistance or fail to close.

8. Power application control circuitry for an electric load comprising
    power relay means including contacts connected between a source of electrical current and the load for controlling the application of power to said load,
    arc suppression means associated with said contacts of said power relay means including
    auxiliary contacts on said power relay means,
    semiconductor means having power conducting terminals connected across said contactor and a gate terminal connected through said auxiliary contacts to a gate energizing signal, and
    actuator means for closing said auxiliary contacts just prior to either the closing or opening of said contactor and for opening said auxiliary contact just after either the closing or opening of said contactor, whereby the potential across said contactor is momentarily reduced to prevent arcing during opening or closing thereof and whereby said gate energizing signal is not maintained when said contactor is closed thereby protecting said semiconductor means against overload in the event said contactor should develop an appreciable contact resistance or fail to close, steering relay means including contacts connected between the source of power and the input terminals of the load for controlling the character of the current flow through said load for causing the current to said load to have a first characteristic when said steering relay means is deenergized and to have a second characteristic when said steering relay means is energized, control circuit means connected to said power relay means and said steering relay means for controlling the operation thereof, said control circuit means including a circuit interconnection through said steering relay means whereby when current of the second characteristic is desired, the contacts of said power relay means close only after said steering relay is energized, said control circuit means further including time delay means for delaying the deenergization of said steering relay means until after the contacts of said power relay have opened and current to the load is completely removed.

9. A circuit for applying power to a three phase electrical motor and for controlling the direction of rotation of the motor, comprising:

first, second and third power relay contactor means connected between a source of electrical current and the motor, arc suppression means connected across each of said power relay contactor means, first, second and third motor power input terminals, means for connecting said first power relay contactor means to said first power input terminal, steering relay contactor means connecting said second and third power relay contactor means to said second and third power input terminals in a first combination, when not actuated, such that said motor will rotate in a forward direction, and for connecting said second and third power relay contactor means to said second and third power input terminals in a second combination, when actuated, such that said motor will rotate in a reverse direction, power relay actuator means for actuating said first, second, and third power relay contactor means such that power is applied to said first power input terminal and to said steering relay contactor means, steering relay actuator means for actuating said steering relay contactor means, means for energizing said power relay actuator means directly such that said first, second and third power relay contactor means are actuated for forward rotation of said motor, and means for energizing said steering relay actuator means and said power relay actuator means such that said first, second and third power relay contactor means are actuated after said steering relay contact means is actuated, and means for causing said steering relay contactor means to remain actuated until after deactuation of said first, second and third relay contactor means, whereby actuation and deactuation of said steering relay contactor means is not performed while power is applied thereto, thereby preventing arcing across said steering relay contactor means.

10. The circuit of claim 9 wherein said steering relay includes a solenoid, an armature magnetically coupled to said solenoid for actuation thereby, a movable contact bar connected to said armature by insulated linkage means, said contact bar having a contact located near the end thereof, a flexible contact bar spaced from said movable contact bar and having a contact located to engage the contact on the movable contact bar when the armature is in a first position, and a bracer bar of a relatively inflexible material extending adjacent said flexible contact bar and having an end positioned near said contact for preventing said flexible contact bar from following the movable contact bar when said armature moves to a second position in the event the contacts become welded.

11. The circuit of claim 10 wherein said steering relay further includes a second flexible contact bar spaced from said movable contact bar and having a contact located to engage the contact on the movable contact bar when the armature is in the second position, and a second bracer bar associated with said second flexible member for preventing it from following the movable contact bar when the armature moves from its second to its first position thereby to prevent a current path between said flexible contact bar and said second flexible contact bar should the contacts become welded.

12. Power application control circuitry for an electronic load comprising power relay means including contacts connected between a source of electrical current and the load for controlling the application of power to said load, semiconductor means having power conducting terminals connected across the contacts of said power relay means, and a gate electrode, switching means for applying control current to said gate electrode, means for actuating said switching means for causing control current to be applied to said gate electrode just prior to either the opening or closing of the contacts of said power relay means and for thereafter removing said control current whereby the potential across said power relay contacts is momentarily reduced to prevent arcing during opening or closing thereof and whreby said control current is not maintained when said contacts are closed thereby protecting said semiconductor means against overload in the event the power relay contacts should develop an appreciable contact resistance or fail to close, steering relay means including contacts connected between the source of power and the input terminals of the load for controlling the character of the current flow through the load for causing the current to the load to have a first charactistic when said relay means is deenergized and to have a second characteristic when said relay means is energized, control circuit means connected to said power relay means and said steering relay means for controlling the operation thereof, said control circuit means including a circuit interconnection through said steering relay means whereby when current of the second characteristic is desired, the contacts of the power relay means close only after the steering relay means is energized, said control circuit further including time delay means for delaying the deenergization of the steering relay means until after the contacts of the power relay means have opened and current to the load is completely removed.

* * * * *